(12) United States Patent
Kurosaki et al.

(10) Patent No.: US 11,261,914 B2
(45) Date of Patent: Mar. 1, 2022

(54) SLIDING MEMBER AND BEARING

(71) Applicant: Senju Metal Industry Co., Ltd., Tokyo (JP)

(72) Inventors: Kimihiko Kurosaki, Tokyo (JP); Kenzo Tadokoro, Tokyo (JP); Minoru Toyoda, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 16/772,067

(22) PCT Filed: Dec. 13, 2018

(86) PCT No.: PCT/JP2018/045857
§ 371 (c)(1),
(2) Date: Jun. 11, 2020

(87) PCT Pub. No.: WO2019/117244
PCT Pub. Date: Jun. 20, 2019

(65) Prior Publication Data
US 2021/0071713 A1   Mar. 11, 2021

(30) Foreign Application Priority Data

Dec. 15, 2017  (JP) .............................. JP2017-241146
Dec. 12, 2018  (JP) .............................. JP2018-232479

(51) Int. Cl.
*F16C 17/02*   (2006.01)
*F16C 33/12*   (2006.01)
(Continued)

(52) U.S. Cl.
CPC .............. *F16C 33/128* (2013.01); *C08K 7/06* (2013.01); *F16C 17/02* (2013.01); *F16C 33/121* (2013.01);
(Continued)

(58) Field of Classification Search
CPC ...... F16C 17/02; F16C 33/121; F16C 33/128; F16C 33/20; F16C 33/201; F16C 2204/50;
(Continued)

(56) References Cited

U.S. PATENT DOCUMENTS 2,757,055 A * 7/1956 Davis .................... F16C 33/14
                                                    384/284
8,967,870 B2   3/2015  Ishii et al.
(Continued)

FOREIGN PATENT DOCUMENTS

CN   101126417 A  *  2/2008
CN   102272469 A     12/2011
(Continued)

*Primary Examiner* — Marcus Charles
(74) *Attorney, Agent, or Firm* — The Webb Law Firm (57) ABSTRACT

A sliding member includes a metallic substrate, a porous layer formed on a surface of the metallic substrate, and a sliding layer that covers the porous layer. The porous layer is made of a metal itself or an alloy composition. The sliding layer is made of a lead-free resin composition. The resin composition consists of a pitch-based carbon fiber and a fluororesin, and assuming weight of the resin composition as 100, more than 10 weight % and 35 weight % or less of the pitch-based carbon fiber is contained.

17 Claims, 3 Drawing Sheets

(51) Int. Cl.
  *F16C 33/20* (2006.01)
  *C08K 7/06* (2006.01)
(52) U.S. Cl.
  CPC .......... *F16C 33/20* (2013.01); *F16C 2204/50* (2013.01); *F16C 2208/02* (2013.01); *F16C 2208/32* (2013.01)
(58) Field of Classification Search
  CPC .............. F16C 2208/02; F16C 2208/30; F16C 2208/32; F16C 2361/53; C08K 3/04; C08K 7/02; C08K 7/06; C08K 2003/0893; C08K 2003/2265; C08K 2003/3009; C08K 214/24; F05C 2251/08
  USPC ............... 384/262, 279, 282, 284, 293, 300; 205/181, 209
  See application file for complete search history.

(56) References Cited

U.S. PATENT DOCUMENTS

| | | | |
|---|---|---|---|
| 9,393,621 B2 * | 7/2016 | Sato | ............. F16C 33/046 |
| 10,077,807 B2 | 9/2018 | Ishii et al. | |
| 2007/0269674 A1 | 11/2007 | Yanase et al. | |
| 2010/0176640 A1 | 7/2010 | Hayashi et al. | |
| 2013/0195388 A1 | 8/2013 | Ishii et al. | |
| 2013/0195707 A1 * | 8/2013 | Kozuma | ............. F04C 18/0215 418/55.1 |
| 2014/0099048 A1 | 4/2014 | Kurata et al. | |
| 2015/0147012 A1 | 5/2015 | Scancarello | |
| 2015/0204383 A1 | 7/2015 | Ishii et al. | |
| 2016/0319867 A1 | 11/2016 | Adam et al. | |
| 2017/0081522 A1 | 3/2017 | Adam et al. | |
| 2019/0186539 A1 | 6/2019 | Kurosaki et al. | |

FOREIGN PATENT DOCUMENTS

| | | | | |
|---|---|---|---|---|
| CN | 103201531 A | | 7/2013 | |
| CN | 104067422 A | * | 9/2014 | ............ H01M 4/366 |
| CN | 104074753 A | * | 10/2014 | .......... F04C 29/0057 |
| CN | 104321550 A | | 1/2015 | |
| CN | 105465160 A | | 4/2016 | |
| CN | 103814226 B | * | 8/2016 | ............ F16C 33/124 |
| CN | 106029794 A | | 10/2016 | |
| CN | 107004651 A | * | 8/2017 | |
| DE | 102014004751 A1 | * | 10/2014 | .......... H01M 8/0202 |
| EP | 1647574 A1 | * | 4/2006 | ............ F16C 33/208 |
| EP | 2871204 A1 | * | 5/2015 | ............. B29C 48/07 |
| EP | 3499060 A1 | | 6/2019 | |
| JP | S62127227 A | | 6/1987 | |
| JP | H5332365 A | | 12/1993 | |
| JP | H6122887 A | | 5/1994 | |
| JP | H0726139 A | * | 1/1995 | ............. C08L 79/08 |
| JP | H7216177 A | | 8/1995 | |
| JP | H083442 A | * | 1/1996 | ............. C08L 77/06 |
| JP | H1121405 A1 | | 1/1999 | |
| JP | 200190836 A | | 4/2001 | |
| JP | 2001132756 A | * | 5/2001 | ............. F16C 33/20 |
| JP | 2002295600 A | | 10/2002 | |
| JP | 2006194397 A | | 7/2006 | |
| JP | 2008303914 A | | 12/2008 | |
| JP | 200919179 A | | 1/2009 | |
| JP | 200979766 A | | 4/2009 | |
| JP | 2010249242 A | | 4/2010 | |
| JP | 2010159808 A | | 7/2010 | |
| JP | 2010159808 A | * | 7/2010 | ............. F16C 17/02 |
| JP | 2010159809 A | | 7/2010 | |
| JP | 2011137528 A | * | 7/2011 | ............. F16C 33/12 |
| JP | 2011137528 A | | 7/2011 | |
| JP | 4825340 B2 | * | 11/2011 | ............ C08L 27/18 |
| KR | 101617327 B1 | * | 5/2016 | ............. B32B 27/00 |
| WO | 2010079719 A1 | | 7/2010 | |

* cited by examiner

SLIDING MEMBER AND BEARING

CROSS-REFERENCE TO RELATED APPLICATIONS

This application is the United States national phase of International Application No. PCT/JP2018/045857 filed Dec. 13, 2018, and claims priority to Japanese Patent Application Nos. 2017-241146 filed Dec. 15, 2017 and 2018-232479 filed Dec. 12, 2018, the disclosures of which are hereby incorporated by reference in their entirety.

TECHNICAL FIELD

The present invention relates to a sliding member slidably supporting a mated member and a bearing using the sliding member.

BACKGROUND ART

A sliding material having a so-called bimetal structure, namely, a two-layer structure in which a Cu-based alloy powder is sintered on a steel plate as a back plate has been often used as a sliding member. In this case, a surface of a metal layer on which the Cu-based alloy powder has been sintered becomes a sliding surface, so that good slidability is ensured by adding lead (Pb) to the Cu-based alloy powder which has been used in the past.

On the other hand, use of Pb has been limited in various kinds of fields in recent years because of harmful effects to human health and a material without using Pb has been proposed for a sliding member. For example, a sliding member using a resin material is proposed as a sliding material without using Pb (see Patent Literature 1).

Further, a past sliding member using the resin material has a three-layer structure in which a Cu-based alloy powder is sintered on a steel plate as a back plate so as to be porous and the porous layer is impregnated with a resin composition in which an additive is mixed with a resin, followed by being baked (for example see Patent Literature 2). In this case, a surface of the resin layer is a sliding surface. As the resin composition, taking a heat-resisting property into consideration, a fluororesin such as polytetrafluoroethylene (PTFE) has been generally used. A sliding member impregnated with such PTFE has been used in, for example, a sliding portion of a shock absorber or the like used in a vehicle or the like. In addition, a bearing having a multi-layer structure, which contains a resin composition containing a polytetrafluoroethylene resin, carbon fibers, and a calcium compound, has been proposed (for example, see Patent literature 3). In addition, the following has been proposed: a cylindrical internal circumference is a bearing bush including a porous sintered layer and a resin layer, and a sliding surface of the bearing bush is formed of a fluororesin composition obtained by blending a thermoplastic resin, carbon fibers, and molybdenum disulfide in a fluororesin (for example, see Patent literature 4). In addition, the following has been proposed: the remainder of the sliding member containing the resin composition is made only of fluororesins (for example, see Patent literatures 5 to 8).

CITATION LIST

Patent Literature

Patent Literature 1: JP S62-127227 A
Patent Literature 2: JP 2010-159808 A
Patent Literature 3: JP 2011-137528 A
Patent Literature 4: JP 2010-159809 A
Patent Literature 5: JP H05-332365 A
Patent Literature 6: JP H06-122887 A
Patent Literature 7: JP 2002-295600 A
Patent Literature 8: JP 2006-194397 A

SUMMARY OF INVENTION

Technical Problem

In the shock absorber embodied in the vehicle or the like, the sliding member is used in a guide bushing for guiding a piston rod to which a motion of a suspension mechanism that displaces following a variation of a road surface or the like is transferred to make a reciprocating motion.

The shock absorber damps vibration utilizing viscosity resistance of a liquid therein against any input from outside. On the other hand, it has been found that any friction force generated by the guide bushing which guides the reciprocating motion of the piston rod has an influence on ride quality of a vehicle or the like.

In other words, a relationship between a static friction force which acts when a static piston rod starts to move and a dynamic friction force which acts when a piston rod moves has an influence on the ride quality of a vehicle or the like. In order to solve the common problem of enhancing the slidability of the sliding member, reducing a dynamic friction coefficient has been common in the past. As described in Patent Literatures 3 and 4, it has been common that the abrasion resistance is improved by blending carbon fibers and further a calcium compound as described in Patent Literature 3 to a resin composition forming a sliding layer of a sliding member. However, in the sliding member in which the sliding layer is impregnated with PTFE, no attempt has been made to increase the static friction force and minimize the rate of change in the dynamic friction force in relation to the static friction force by adjusting the blending of pitch-based carbon fibers and PTFE instead of simply lowering the dynamic friction coefficient.

An object of the present invention is to provide a sliding member that enables the relationship between the static friction force and the dynamic friction force to be controlled, and a bearing using the sliding member.

Solution to Problem

The present inventors have found that the static friction force can become large and the relationship between the static friction force and the dynamic friction force can be controlled, by containing a predetermined amount of pitch-based carbon fibers in a resin composition forming a sliding layer.

In addition, the present invention provides a sliding member comprising: a metallic substrate; a porous layer formed on a surface of the metallic substrate; and a sliding layer that covers the porous layer, wherein the porous layer is made of a metal itself or an alloy composition, wherein the sliding layer is made of a lead-free resin composition, wherein the resin composition consists of a pitch-based carbon fiber and a fluororesin, and assuming weight of the resin composition as 100, more than 10 weight % and 35 weight % or less of the pitch-based carbon fiber is contained.

It is preferred that the resin composition contains more than 10 weight % and 17 weight % or less of the pitch-based carbon fiber.

In addition, the present invention provides a sliding member comprising: a lead-free resin composition, wherein assuming weight of the resin composition as 100, the resin composition contains more than 10 weight % and 35 weight % or less of a pitch-based carbon fiber, wherein the resin composition further contains any of or a combination of two or more of an aramid fiber, an iron oxide, molybdenum disulfide, a graphite, and zinc, zinc alloy or zinc compound, more than 0 weight % and 14 weight % or less of the aramid fiber is contained when the aramid fiber is added; more than 0 weight % and 37 weight % or less of the iron oxide is contained when the iron oxide is added; more than 0 weight % and 20 weight % or less of the molybdenum disulfide is contained when the molybdenum disulfide is added; more than 0 weight % and 10 weight % or less of the graphite is contained when the graphite is added; more than 0 weight % and 40 weight % or less of the zinc, zinc alloy or zinc compound is contained when the zinc, zinc alloy or zinc compound is added, and the remainder is a fluororesin.

In addition, the present invention provides a sliding member comprising: a metallic substrate; a porous layer formed on a surface of the metallic substrate; and a sliding layer that covers the porous layer, wherein the porous layer is made of a metal itself or an alloy composition, wherein the sliding layer is made of a lead-free resin composition, wherein assuming weight of the resin composition as 100, the resin composition contains more than 10 weight % and 35 weight % or less of a pitch-based carbon fiber, wherein the resin composition further contains any of or a combination of two or more of an aramid fiber, an iron oxide, molybdenum disulfide, a graphite, and zinc, zinc alloy or zinc compound, more than 0 weight % and 14 weight % or less of the aramid fiber is contained when the aramid fiber is added; more than 0 weight % and 37 weight % or less of the iron oxide is contained when the iron oxide is added; more than 0 weight % and 20 weight % or less of the molybdenum disulfide is contained when the molybdenum disulfide is added; more than 0 weight % and 10 weight % or less of the graphite is contained when the graphite is added; more than 0 weight % and 40 weight % or less of the zinc, zinc alloy or zinc compound is contained when the zinc, zinc alloy or zinc compound is added, and the remainder is a fluororesin.

It is preferred that the pitch-based carbon fiber has a fiber diameter of 5 µm or more and 20 µm or less, a fiber length of 10 µm or more and 150 µm or less, and an aspect ratio of 2 or more and 20 or less. In addition, it is preferred that the fluororesin is polytetrafluoroethylene.

In addition, the present invention provides a bearing comprising: a metallic substrate; a porous layer formed on a surface of the metallic substrate; and a sliding layer that covers the porous layer, the sliding layer being a cylindrical internal circumference and annular innermost layer, wherein the porous layer is made of a metal itself or an alloy composition, wherein the sliding layer is made of a lead-free resin composition, wherein the resin composition consists of a pitch-based carbon fiber and a fluororesin, and assuming weight of the resin composition as 100, more than 10 weight % and 35 weight % or less of the pitch-based carbon fiber is contained.

In addition, the present invention provides a bearing comprising: a metallic substrate; a porous layer formed on a surface of the metallic substrate; and a sliding layer that covers the porous layer, the sliding layer being a cylindrical internal circumference and annular innermost layer, wherein the porous layer is made of a metal itself or an alloy composition, wherein the sliding layer is made of a lead-free resin composition, wherein assuming weight of the resin composition as 100, the resin composition contains more than 10 weight % and 35 weight % or less of a pitch-based carbon fiber, wherein the resin composition further contains any of or a combination of two or more of an aramid fiber, an iron oxide, molybdenum disulfide, a graphite, and zinc, zinc alloy or zinc compound, more than 0 weight % and 14 weight % or less of the aramid fiber is contained when the aramid fiber is added; more than 0 weight % and 37 weight % or less of the iron oxide is contained when the iron oxide is added; more than 0 weight % and 20 weight % or less of the molybdenum disulfide is contained when the molybdenum disulfide is added; more than 0 weight % and 10 weight % or less of the graphite is contained when the graphite is added; more than 0 weight % and 40 weight % or less of the zinc, zinc alloy or zinc compound is contained when the zinc, zinc alloy or zinc compound is added, and the remainder is the fluororesin.

Advantageous Effects of Invention

In the present invention, by adding a predetermined amount of pitch-based carbon fibers, the static friction force can be increased, and the rate of change of the dynamic friction force in relation to the static friction force can be reduced, and further, abrasion can be prevented. Accordingly, when the sliding member of the present invention is applied to a shock absorber, the ride quality can be improved.

DESCRIPTION OF EMBODIMENTS

Embodiment of a sliding member of the present invention and embodiment of a bearing to which the sliding member of the present invention is applied are described below with reference to the drawings.

<Configuration Example of Sliding Member in Present Embodiment>

The sliding member in the present embodiment is formed of a lead-free resin composition. The resin composition contains a fluororesin, and contains a pitch-based carbon fiber as an essential additive. The resin composition contains more than 10 weight % and 35 weight % or less of the pitch-based carbon fiber, and the remainder is the fluororesin. The pitch-based carbon fiber has a fiber diameter of 5 µm or more and 20 µm or less, a fiber length of 10 µm or more and 150 µm or less, and an aspect ratio of 2 or more and 20 or less. The sliding member in the present embodiment is used so as to cover a surface of a metallic substrate and cover a metallic porous layer formed on a surface of the metallic substrate.

Figure 1:
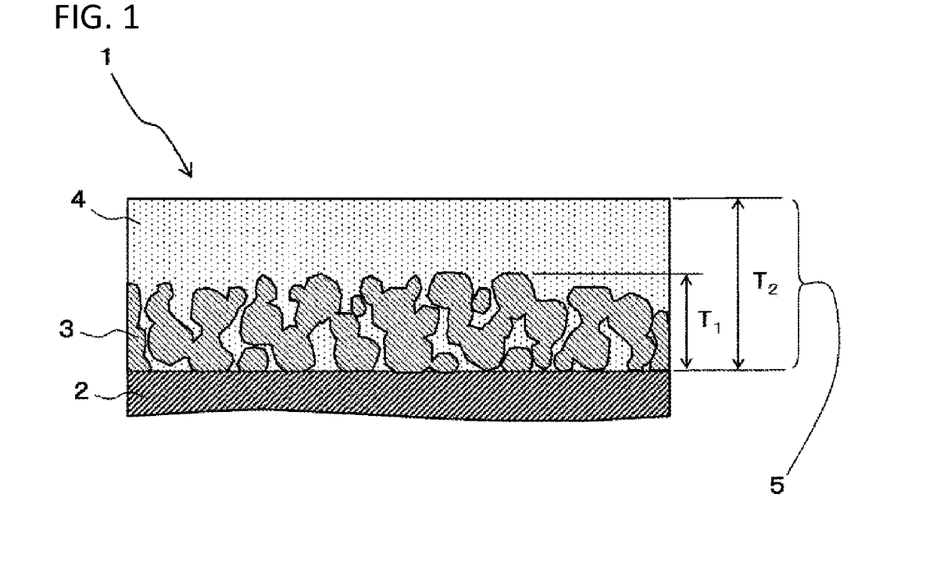
FIG. 1 is a sectional view of a sliding member, as an example, in the present embodiment.

FIG. 1 is a sectional view of a sliding member, as an example, in the present embodiment. A sliding member 1 in the present embodiment contains a metallic substrate 2, a porous layer 3 formed on a surface of the metallic substrate 2, the porous layer being made of a metal itself or an alloy composition, and a sliding layer 5 in which the porous layer 3 is covered with a resin composition 4.

The porous layer 3 is formed by sintering a metallic powder on a surface of the metallic substrate 2. In this embodiment, a copper plated steel plate in which copper (Cu) has been plated on an iron (Fe)-based plate is used as the metallic substrate 2. As the metallic powder forming the porous layer 3, Cu itself or an alloy containing Cu as a main component is used, and a Cu—Sn based alloy powder is used in this embodiment.

In a manufacturing method of the porous layer 3, the Cu—Sn based alloy powder is sprayed on the copper plated steel plate with a desired thickness thereof and the copper plated steel plate on which the Cu—Sn based alloy powder has been sprayed is sintered in a sintering furnace. As a result, the porous layer 3 made of a Cu—Sn based alloy with a desired thickness thereof is formed on the copper plated steel plate.

The porous layer 3 is impregnated with the resin composition 4 so as to have a predetermined thickness thereof and the porous layer 3 that has been impregnated with the resin composition 4 is baked, and then, the sliding layer 5 is formed. In this embodiment, as the resin composition 4, a resin and additives are mixed. As the resin, polytetrafluoroethylene (PTFE) is used as an example of the fluororesin.

The resin composition 4 contains a pitch-based carbon fiber as an essential additive. As other optional additives, the resin composition 4 may include any of or a combination of two or more of an aramid fiber, an iron oxide, molybdenum disulfide, a graphite, and zinc, zinc alloy or zinc compound.

In a manufacturing method of the sliding layer 5, a predetermined amount of the resin composition 4 is supplied onto the porous layer 3 formed on the surface of the metallic substrate 2, and the resin composition 4 is pressed on the porous layer 3, so that the porous layer 3 is impregnated with the resin composition 4. The amount of the resin composition 4 supplied onto the porous layer 3 is an amount of the resin composition 4 which covers the porous layer 3 with a thickness such that the porous layer 3 is not exposed from a surface of the sliding layer 5 after the resin composition 4 is baked, which is described later.

When the resin composition 4 is heated at a temperature which exceeds a melting point of a resin contained in the resin composition 4, the resin is melted and an organic solvent is volatilized, and then, the resin is hardened and the sliding layer 5 is formed. Here, the term "bake" is referred to as "heating the resin composition 4 at a predetermined temperature to form the sliding layer 5". The melting point of polytetrafluoroethylene used as the resin is 327° C.

The sliding layer 5 is baked using the baking furnace in this embodiment by heating the resin composition 4 at a temperature which exceeds the melting point of polytetrafluoroethylene.

In the sliding member 1 in this embodiment, all of the metallic powders for forming the porous layer 3 may have a particle diameter within a range of about 15 μm to 180 μm, preferably about 25 μm to 150 μm. In addition, in the sliding member 1, a thickness $T_1$ of the porous layer 3 formed by using the metallic powders having such a particle diameter may be set to be about 0.06 mm to 0.35 mm. The thickness of the porous layer 3 is a thickness such that at least two pieces of the metallic powders are laid in piles and sintered.

Further, in the sliding member 1, a thickness $T_2$ of the sliding layer 5 may be set to be about 0.08 mm to 0.43 mm.

Here, the thickness $T_2$ of the sliding layer 5 is referred to as "a thickness of the sliding layer 5 from a surface of the metallic substrate 2". The thickness of the sliding layer 5 is set to be averagely larger than the thickness of the porous layer 3 so that the porous layer 3 is not exposed. In this embodiment, the thickness $T_2$ of the sliding layer 5 is set to be 0.3 mm.

<Configuration Example of Bearing in Present Embodiment>

Figure 2:
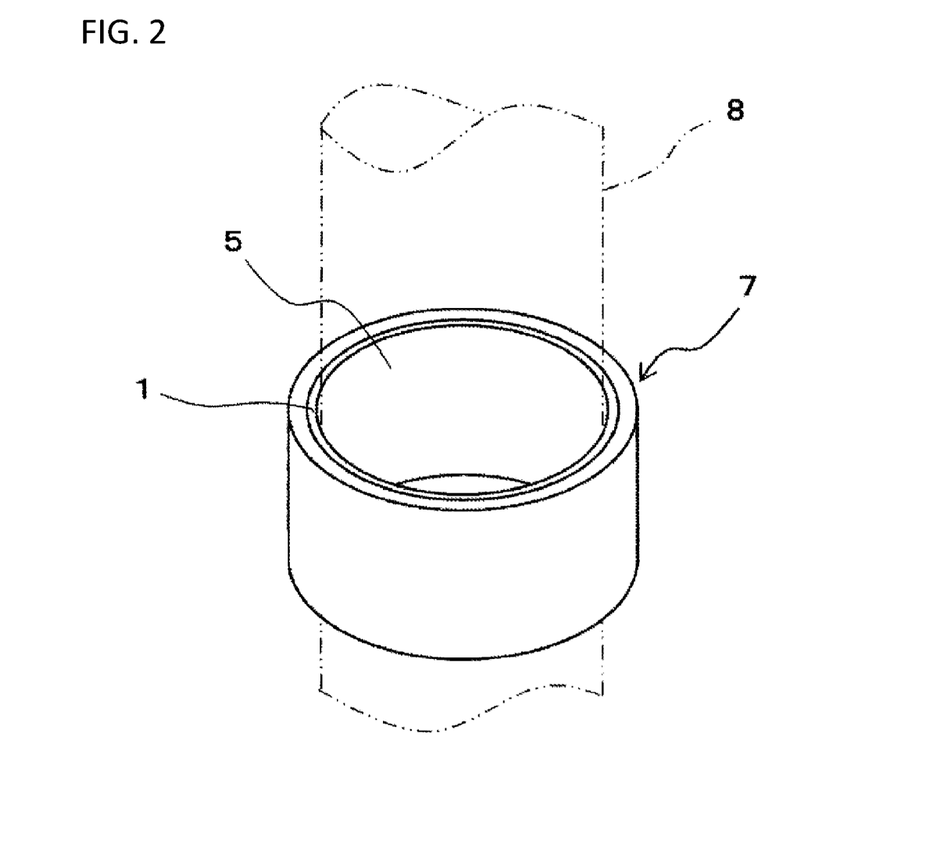
FIG. 2 is a perspective view of a bearing, as an example, in the present embodiment.
Figure 3:
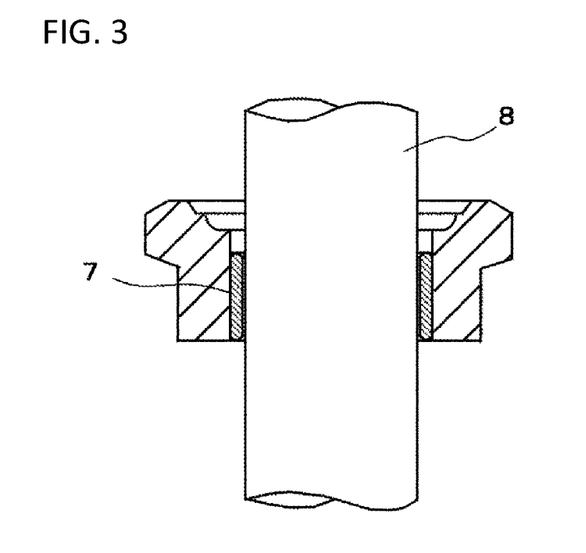
FIG. 3 is a sectional view of the bearing, as an example, in the present embodiment.

FIG. 2 is a perspective view of a bearing, as an example, in the present embodiment, and FIG. 3 is a sectional view of the bearing, as an example, in the present embodiment, in which the sliding member 1 in the present embodiment is used.

A bearing 7 in the present embodiment is configured such that the sliding member 1 shown in FIG. 1 is annularly formed with the sliding layer 5 being inwardly arranged. The bearing 7 supports a rod 8 as a mated member with the sliding layer 5 forming a cylindrical internal circumference. The bearing 7 is configured so that the rod 8 is slid under a linear motion.

The bearing 7 in the present embodiment is used for a vibration damping apparatus such as a shock absorber used for a vehicle or the like and is used as a sliding portion of a guide bushing for guiding a piston rod which reciprocates, in the shock absorber, with a motion of a suspension mechanism that displaces following a variation of a road surface or the like being transferred to the sliding portion.

In the sliding member 1, the rod 8, which is a piston rod, is a sliding mated member and the resin composition 4 forming the sliding layer 5 contacts the mated member directly or via a fluid such as oil. In the mated member of the sliding member 1, a surface thereof made of a stainless steel or Fe is configured to be covered with Cr (chromium) or Ti (titanium) by means of a method such as a plating method. The mated member of the sliding member 1 may be made of Cr, Ti themselves or their alloy.

Figure 4:
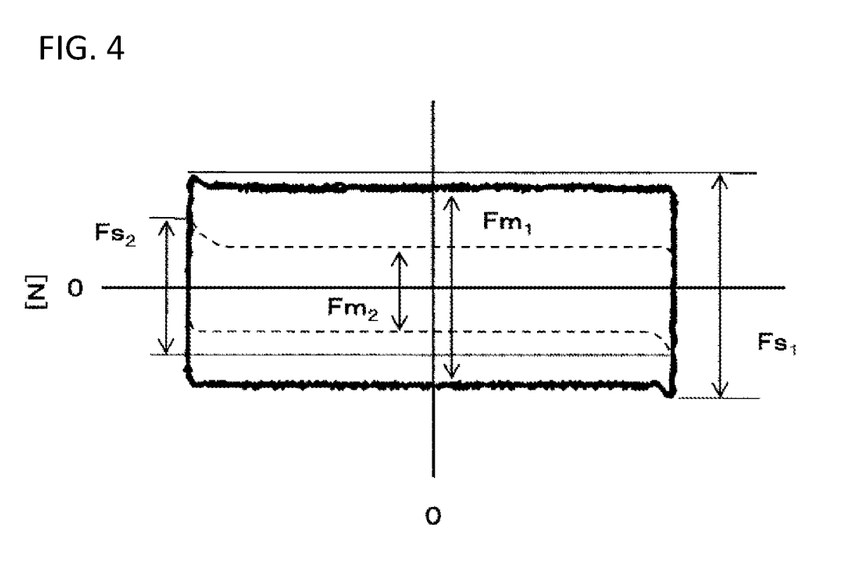
FIG. 4 is a graph showing a relationship between a static friction force and a dynamic friction force.

FIG. 4 is a graph showing a relationship between a static friction force and a dynamic friction force. In FIG. 4, a vertical axis indicates a friction force (N) and a horizontal axis indicates a stroke (mm). In the shock absorber used for a vehicle or the like, the piston rod reciprocates based on the fact that the suspension follows the variations of the road surface or the like. Based on the fact that the piston rod reciprocates, there is a state where the piston rod stands still.

Accordingly, in the guide bushing used for the shock absorber, in the case where the rate of change in a dynamic friction force $Fm_2$ in relation to a static friction force $Fs_2$ is large, as shown in broken lines of FIG. 4, it is felt uncomfortable to ride in the vehicle or the like. In the case where the static friction force $Fs_2$ is small, it is also felt uncomfortable to ride in the vehicle or the like. In the case where the static friction force $Fs_2$ is large and the rate of change in the dynamic friction force $Fm_2$ in relation to the static friction force $Fs_2$ is small, the ride quality of the vehicles or the like is improved.

Therefore, in the sliding member 1 used as the bearing 7 constituting the guide bushing, a pitch-based carbon fiber is added to the resin composition 4 forming the sliding layer 5 which contacts the rod 8 as the piston rod and guides the reciprocating motion of the piston rod. Hereinafter, the resin composition 4 is described in detail.

[Fluororesin]

The fluororesin which is a base resin of the resin composition 4 is a common synthetic resin having an excellent sliding characteristic to maintain a sufficient heat-resisting property for heat generated when any sliding friction occurs.

Therefore, PTFE resins, PFA copolymer resins, FEP copolymer resins, and ETFE copolymer resins are often used as the base resin of the resin composition of the sliding member.

As the PTFE resin on the market. D-210C or F-201 of POLYFLON (registered trademark) manufactured by Daikin Industries, Ltd; AD911D of Fluon (registered trademark) manufactured by Asahi Glass Co., Ltd; 31JR or 6C-J of Teflon (registered trademark) manufactured by Chemours-Mitsui Fluoro products Co., Ltd and the like are exemplified.

[Pitch-Based Carbon Fiber]

The pitch-based carbon fiber (CF) is an essential additive to the resin composition 4 forming the sliding layer 5 in order to improve the value of the static fiction force and the rate of change in the dynamic friction force in relation to the static friction force. The pitch-based carbon fiber is used as a function-imparting material and a reinforcing material for the resin composition 4 forming the sliding layer 5 which contacts the mated member directly or via a fluid such as oil.

It is preferable that the resin composition 4 contains more than 10 weight % and 35 weight % or less of the pitch-based carbon fiber. It is also preferable that the pitch-based carbon fiber has a fiber diameter of 5 µm or more and 20 µm or less, a fiber length of 10 µm or more and 150 µm or less, and an aspect ratio of 2 or more and 20 or less.

The pitch-based carbon fiber has high strength, high modulus, excellent abrasion resistance, a high specific frequency, and an excellent vibration damping and absorbing performance. These characteristics of the pitch-based carbon fiber allow the static friction force to increase and allow the rate of change in the dynamic friction force in relation to the static friction force to be reduced, by containing a predetermined amount of the pitch-based carbon fiber in the resin composition 4. This enables the value of the static friction force and the rate of change in the dynamic friction force in relation to the static friction force to be improved, thereby improving sliding characteristics.

In the case where 10 weight % or less of the pitch-based carbon fiber is added, the rate of change in the dynamic friction force in relation to the static friction force is large and self-abrasion quantity also increases. In the case where more than 35 weight % of the pitch-based carbon fiber is added, the static friction force is excessive. This may block its dispersiveness and deteriorate impregnation into the porous layer. Further, in the case where the pitch-based carbon fiber has a fiber length of more than 150 µm, the impregnation into the porous layer deteriorates and the pitch-based carbon fiber may be left out from the resin composition 4. It is to be noted that as the pitch-based carbon fiber on the market, DONACARBO manufactured by Osaka Gas Chemicals Co., Ltd., DIALEAD manufactured by Mitsubishi Chemical Corporation and the like are exemplified.

[Aramid Fiber]

In the present invention, the aramid fiber is not an essential additive for the resin composition 4 forming the sliding layer 5, but a predetermined amount of aramid fibers may be added in the resin composition 4 for improving the value of the static fiction force and the rate of change in the dynamic friction force in relation to the static friction force to improve the sliding characteristics. It is preferable that more than 0 weight % and 14 weight % or less of the aramid fiber is contained when the aramid fiber is added.

By adding the predetermined amount of aramid fibers to the resin composition 4, the resin composition 4 allows the abrasion resistance to be enhanced without hindering the value of the static friction force and the rate of change in the dynamic friction force in relation to the static friction force from being improved when the pitch-based carbon fiber is added, allows the value of the static friction force to be made large and allows the rate of change in the dynamic friction force in relation to the static friction force to be reduced.

Adding the aramid fiber hinders homogeneous dispersion when the additive amount of the aramid fiber exceeds 14 weight %, so that the abrasion resistance deteriorates. It is to be noted that as the aramid fiber on the market, Kevlar (registered trademark) manufactured by DU PONT-TORAY CO., LTD., Twaron (registered trademark) manufactured by TEIJIN LIMITED and the like are exemplified.

[Iron Oxide]

In the present invention, iron oxide ($FeO_2$, $Fe_2O_3$) is not an essential additive for the resin composition 4 forming the sliding layer 5, but a predetermined amount of iron oxide may be contained in the resin composition 4. It is preferable that more than 0 weight % and 37 weight % or less of the iron oxide is contained when the iron oxide is added.

By adding the predetermined amount of iron oxide to the resin composition 4, the resin composition 4 allows the slidability to be reduced without hindering the value of the static friction force and the rate of change in the dynamic friction force in relation to the static friction force from being improved when the pitch-based carbon fiber is added, allows the value of the static friction force to be made large and allows the rate of change in the dynamic friction force in relation to the static friction force to be reduced.

Adding the iron oxide deteriorates the impregnation into the porous layer in the impregnation step when the additive amount of the iron oxide exceeds 37 weight %. It is to be noted that as the iron oxide on the market, Bengara Color Series manufactured by MORISHITA BENGARA KOUGYO CO., LTD, and the like are exemplified.

[Molybdenum Disulfide]

In the present invention, molybdenum disulfide ($MoS_2$) is not an essential additive for the resin composition 4 forming the sliding layer 5, but a predetermined amount of molybdenum disulfide may be contained in the resin composition 4. It is preferable that more than 0 weight % and 20 weight % or less of the molybdenum disulfide is contained when the molybdenum disulfide is added.

By adding the predetermined amount of the molybdenum disulfide to the resin composition 4, the resin composition 4 allows the frictional resistance to be reduced without hindering the value of the static friction force and the rate of change in the dynamic friction force in relation to the static friction force from being improved when the pitch-based carbon fiber is added.

Adding the molybdenum disulfide deteriorates the impregnation into the porous layer in the impregnation step when the additive amount of the molybdenum disulfide exceeds 20 weight %. It is to be noted that as the molybdenum disulfide on the market. H/GMoS2 manufactured by TAIYO KOKO Co., Ltd., Molybdenum Disulfide Powder Series manufactured by DAIZO CORPORATION and the like are exemplified.

[Graphite]

In the present invention, the graphite (C) is not an essential additive for the resin composition 4 forming the sliding layer 5, but a predetermined amount of graphite may be contained in the resin composition 4. It is preferable that more than 0 weight % and 10 weight % or less of the graphite is contained when the graphite is added.

By adding the predetermined amount of the graphite to the resin composition 4, the resin composition 4 allows the frictional resistance to be reduced without hindering the value of the static friction force and the rate of change in the dynamic friction force in relation to the static friction force from being improved when the pitch-based carbon fiber is added.

Adding the graphite deteriorates the impregnation into the porous layer in the impregnation step when the additive amount of the graphite exceeds 10 weight %. It is to be noted that as the graphite on the market, GRAPHITE POWDER SERIES manufactured by Nippon Kokuen Group and the like are exemplified.

[Zinc, Zinc Alloy, Zinc Compound]

In the present invention, zinc (Zn), a zinc alloy (Zn alloy), or a zinc compound (Zn compound) is not an essential additive for the resin composition 4 forming the sliding layer 5, but a predetermined amount of the Zn, Zn alloy or Zn compound may be contained in the resin composition 4. It is preferable that more than 0 weight % and 40 weight % or less of the Zn, Zn alloy or Zn compound is contained when the Zn. Zn alloy or Zn compound is added. A particle diameter of Zn. Zn alloy or Zn compound is preferably 1 μm or more and 50 μm or less, more preferably 1 μm or more and 25 μm or less, taking into consideration dispersiveness to the fluororesin and a thickness of the resin layer made of the resin composition.

Assuming weight of the Zn alloy as 100, the Zn alloy contains 3.5 weight % or more and 4.3 weight % or less of Al, 0.75 weight % or more and 1.25 weight % or less of Cu, 0.020 weight % or more and 0.06 weight % or less of Mg, 0.10 weight % or less of Fe, and the remainder being Zn and inevitable impurities.

Alternatively, assuming weight of the Zn alloy as 100, the Zn alloy contains 3.5 weight % or more and 4.3 weight % or less of Al, 0.25 weight % or less of Cu, 0.020 weight % or more and 0.06 weight % or less of Mg, 0.10 weight % or less of Fe, and the remainder being Zn and inevitable impurities. Examples of the Zn compound include ZnO, ZnS, $ZnSO_4$, and the like.

By adding the predetermined amount of Zn, Zn alloy or Zn compound to the resin composition 4, the resin composition 4 allows the rate of change in the dynamic friction force in relation to the static friction force to be reduced without hindering the value of the static friction force and the rate of change in the dynamic friction force in relation to the static friction force from being improved when the pitch-based carbon fiber is added.

Adding the Zn, Zn alloy or Zn compound deteriorates the impregnation into the porous layer in the impregnation step when the additive amount of the Zn, Zn alloy or Zn compound exceeds 40 weight %, so that the abrasion resistance deteriorates.

EXAMPLES

The guide bushings were prepared using the sliding members having compositions in Examples 1 to 7 and Comparison Examples 1 to 3, as shown in Table 1, and their static friction forces and their rates of change in the dynamic friction force in relation to the static friction force were measured.

(1) Verification Method

Figure 5:
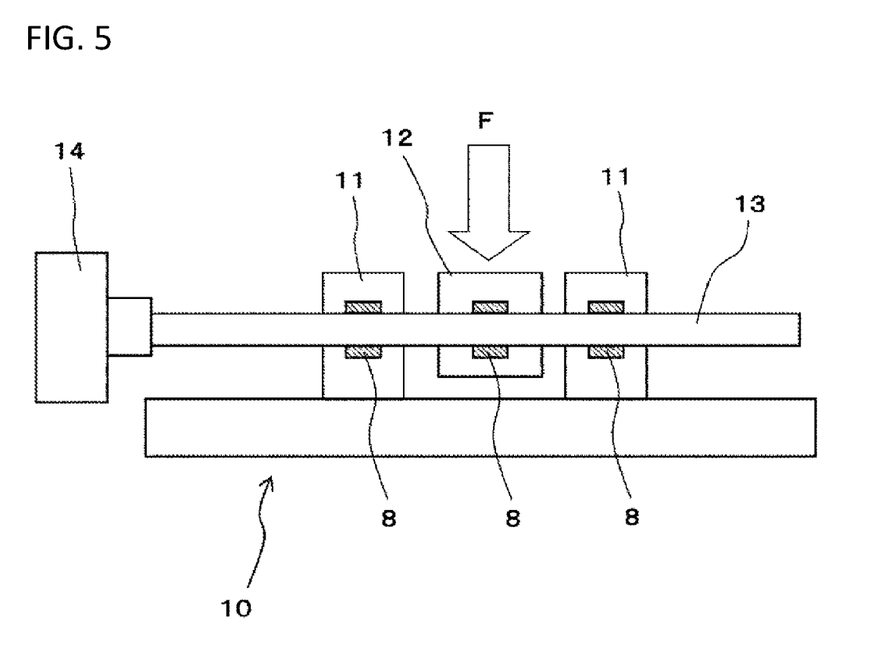
FIG. 5 is a diagram showing a configuration example of a testing machine for measuring the static friction force and the dynamic friction force.

FIG. 5 shows a configuration example of a testing machine for measuring the static friction force and the dynamic friction force. In a testing machine 10, guide bushings 8 to be tested were mounted on bearing bases 11 and a load portion 12. Any traverse loads were applied to the load portion 12, via the guide bushing 8, between the bearing bases 11 supporting a rod 13 through the guide bushings 8. A friction force when vibrating the rod 13, to which the traverse load had been applied, by a vibrator (not shown), was measured by a load cell 14.

In Examples 1 to 7, a pitch-based carbon fiber having a fiber diameter of 13 μm, an average fiber length of 40 μm and an aspect ratio of 3 was used. As the pitch-based carbon fiber used in Examples 1 to 7, for example, DONACARBO S-2404N manufactured by Osaka Gas Chemicals Co., Ltd. was exemplified. In Comparison Example 2, a pitch-based carbon fiber having a fiber diameter of 14.5 μm, an average fiber length of 130 μm, and an aspect ratio of 9 was used. In Comparison Example 3, the pitch-based carbon fiber which was the same as those in Examples 1 to 7 was used.

Measurement Conditions

Mated member: S45C+hard chromium plating, surface roughness Rz of 0.3 μm

Vibrator: 0.001 μm/sec (stroke of 5 mm)

Traverse load: 98N (10 kgf), 196N (20 kgf) and 294N (30 kgf)

Lubricating oil: oil for shock absorber (2) Determination Criteria (1) Static Friction Force A: The static friction force that is 51 N or more and less than 115 N when the load was 294 N.

B: The static friction force that is 115 N or more and 120N or less when the load was 294 N.

C: The static friction force that is 45 N or more and less than 51 N when the load was 294 N.

D: The static friction force that is less than 45 N or more than 120 N when the load was 294 N.

(2) Rte of Change in Dynamic Friction Force in relation to Static Friction Force A: 16% or less B: more than 16% and 17% or less C: more than 17%

TABLE 1

|  | Example 1 | Example 2 | Example 3 | Example 4 | Example 5 | Example 6 | Example 7 | Comparative Example 1 |
|---|---|---|---|---|---|---|---|---|
| Fluororesin (wt %) | Balance | Balance | Balance | Balance | Balance | Balance | Balance | 100 |
| Pitch-based carbon fiber (wt %) | 11 | 11.4 | 11 | 11 | 11 | 16.4 | 35 | — |
| Aramid fiber (wt %) | — | — | — | 1.6 | 1.7 | — | — | — |
| Iron oxide | — | — | 11 | — | 5 | 5 | — | — |

TABLE 1-continued

|  | Example 1 | Example 2 | Example 3 | Example 4 | Example 5 | Example 6 | Example 7 | Comparative Example 1 |
|---|---|---|---|---|---|---|---|---|
| Molybdenum disulfide (wt %) | — | — | — | — | 3.7 | — | — | — |
| Graphite (wt %) | — | — | — | 1.7 | — | — | — | — |
| Zinc or zinc alloy (wt %) | — | — | 14.2 | — | — | — | — | — |
| Static friction force | A | A | A | A | A | A | B | D |
| Rate of change | A | A | A | A | A | A | A | C |

As shown in Table 1, in each of Examples in which the pitch-based carbon fiber having a fiber diameter of 13 μm, an average fiber length of 40 μm and an aspect ratio of 3 was used, it has been found that, in the resin composition in Example 1 containing 11 weight % of the pitch-based carbon fiber, and the remainder being the fluororesin (PTFE), the static friction force could be made large to be a desired one and the rate of change in the dynamic friction force in relation to the static friction force could be reduced.

It has also been found that, in the resin composition in Example 2 containing 11.4 weight % of the pitch-based carbon fiber, 0.1 weight % of the iron oxide, and the remainder being the fluororesin, the static friction force could be made to be a desired one and the rate of change in the dynamic friction force in relation to the static friction force could be reduced.

It has further been found that, in the resin composition in Example 3 containing 11 weight % of the pitch-based carbon fiber, 14.2 weight % of the zinc alloy, and the remainder being the fluororesin, the static friction force could be made to be a desired one and the rate of change in the dynamic friction force in relation to the static friction force could be reduced. As the zinc alloy, an alloy having the above composition can be selected and used as appropriate. In this Example 3. Zn-3.89Al-0.05Cu-0.05Mg-0.01Fe was used.

It has additionally been found that, in the resin composition in Example 4 containing 11 weight % of the pitch-based carbon fiber, 5 weight % of the iron oxide, 1.6 weight % of the aramid fiber, 1.7 weight % of the graphite, and the remainder being the fluororesin, the static friction force could be made to be a desired one and the rate of change in the dynamic friction force in relation to the static friction force can be reduced.

It has still further been found that, in the resin composition in Example 5 containing 11 weight % of the pitch-based carbon fiber, 5 weight % of the iron oxide, 1.7 weight % of the aramid fiber, 3.7 weight % of the molybdenum disulfide, and the remainder being the fluororesin, the static friction force could be made to be a desired one and the rate of change in the dynamic friction force in relation to the static friction force could be reduced.

It has also been found that, in the resin composition in Example 6 containing 16.4 weight % of the pitch-based carbon fiber, and the remainder being the fluororesin, the static friction force could be made to be a desired one and the rate of change in the dynamic friction force in relation to the static friction force could be reduced.

It has also been found that, in the resin composition in Example 7 containing 35 weight % of the pitch-based carbon fiber, and the remainder being the fluororesin, the static friction force could be made to be a desired one and the rate of change in the dynamic friction force in relation to the static friction force could be reduced. In all of Examples 1 to 7, any self-abrasion of the sliding member and any abrasion of the mated member were controlled.

In contrast, it has been found that, in the resin composition in Comparison Example 1 containing 100 weight % of the fluororesin, the static friction force could not be made large to be a desired one and the rate of change in the dynamic friction force in relation to the static friction force increased.

It has been found that, in the resin composition in Comparison Example 2 containing 10 weight % of the pitch-based carbon fiber having a fiber diameter of 14.5 μm, an average fiber length of 130 μm, and an aspect ratio of 9, and the remainder being the fluororesin, the static friction force was large and the rate of change in the dynamic friction force in relation to the static friction force had a tendency to reduce, as compared with the case of the resin composition containing no pitch-based carbon fibers, but the value of the static friction force and the rate of change in the dynamic friction force in relation to the static friction force could not be set to a desired value. In the case where the resin composition contains 10 weight % of the pitch-based carbon fiber, the self-abrasion is made excessive. In Comparison Example 2, the value of the static friction force and the rate of change in the dynamic friction force in relation to static friction force could not be set to a desired value even if the pitch-based carbon fiber was the same as those used in Examples 1 to 7.

It has also been found that, in the resin composition in Comparison Example 3 containing 36 weight % of the pitch-based carbon fiber having a fiber diameter of 13 μm, an average fiber length of 40 μm, and an aspect ratio of 3, and the remainder being the fluororesin, the static friction force was excessive.

In a case of PAN-based carbon fibers, the rate of change in the dynamic friction force in relation to the static friction force had a tendency to reduce but the value of the static friction force could not be a desired one.

Accordingly, it has been found that, by containing more than 10 weight % and 35 weight % or less of a pitch-based carbon fiber having a fiber diameter of 5 μm or more and 20 μm or less, a fiber length of 10 μm or more and 150 μm or less and an aspect ratio of 2 or more and 20 or less, the static friction force can be made large to be a desired one and the rate of change in the dynamic friction force in relation to the static friction force can be reduced. It has been found that taking the value of the static friction force into consideration, more than 10 weight % and 17 weight % or less of the pitch-based carbon fiber is preferably contained and the value of the static friction force can be further improved to a desired one.

It has been found that the effect of improving the value of the static friction force and effect of improving the rate of change in the dynamic friction force in relation to the static friction force, the effects being obtained by containing the pitch-based carbon fiber within a scope of the present invention, are not hindered even if the resin composition contains any of or a combination of two or more of an aramid fiber, an iron oxide, molybdenum disulfide, a graphite, and zinc, zinc alloy or zinc compound, and the sliding characteristic is improved.

REFERENCE SIGNS LIST

1: Sliding member
10: Bearing
2: Metallic substrate
3: Porous layer
4: Resin composition
5: Sliding layer
7: Bearing

The invention claimed is:

1. A sliding member comprising:
a metallic substrate;
a porous layer formed on a surface of the metallic substrate; and
a sliding layer that covers the porous layer,
wherein the porous layer is made of a metal itself or an alloy composition,
wherein the sliding layer is made of a lead-free resin composition,
wherein the resin composition consists of a pitch-based carbon fiber and a fluororesin, and assuming weight of the resin composition as 100, more than 10 weight % and 35 weight % or less of the pitch-based carbon fiber is contained and the remainder of the resin composition is only the fluororesin.

2. The sliding member according to claim 1,
wherein the pitch-based carbon fiber has a fiber diameter of 5 μm or more and 20 μm or less, a fiber length of 10 μm or more and 150 μm or less, and an aspect ratio of 2 or more and 20 or less.

3. The sliding member according to claim 1,
wherein the fluororesin is polytetrafluoroethylene.

4. The sliding member according to claim 1,
wherein the resin composition contains more than 10 weight % and 17 weight % or less of the pitch-based carbon fiber.

5. The sliding member according to claim 4,
wherein the pitch-based carbon fiber has a fiber diameter of 5 μm or more and 20 μm or less, a fiber length of 10 μm or more and 150 μm or less, and an aspect ratio of 2 or more and 20 or less.

6. The sliding member according to claim 4,
wherein the fluororesin is polytetrafluoroethylene.

7. A sliding member comprising:
a lead-free resin composition,
wherein the lead-free resin composition consists of a pitch-based carbon fiber, a fluororesin, and any of or a combination of two or more of an aramid fiber, an iron oxide, molybdenum disulfide, a graphite, and zinc, zinc alloy or zinc compound,
wherein assuming weight of the resin composition as 100, a content of the pitch-based carbon fiber is more than 10 weight % and 35 weight % or less,
a content of the aramid fiber is more than 0 weight % and 14 weight % or less when the aramid fiber is added;
a content of the iron oxide is more than 0 weight % and 37 weight % or less when the iron oxide is added;
a content of the molybdenum disulfide is more than 0 weight % and 20 weight % or less when the molybdenum disulfide is added;
a content of the graphite is more than 0 weight % and 10 weight % or less when the graphite is added;
a content of the zinc, zinc alloy or zinc compound is more than 0 weight % and 40 weight % or less when the zinc, zinc alloy or zinc compound is added, and the remainder is the fluororesin.

8. The sliding member according to claim 7,
wherein the pitch-based carbon fiber has a fiber diameter of 5 μm or more and 20 μm or less, a fiber length of 10 μm or more and 150 μm or less, and an aspect ratio of 2 or more and 20 or less.

9. The sliding member according to claim 7,
wherein the fluororesin is polytetrafluoroethylene.

10. The sliding member according to claim 7, further comprising:
a metallic substrate;
a porous layer formed on a surface of the metallic substrate; and
a sliding layer that covers the porous layer,
wherein the porous layer is made of a metal itself or an alloy composition,
wherein the sliding layer is made of the lead-free resin composition.

11. The sliding member according to claim 10,
wherein the pitch-based carbon fiber has a fiber diameter of 5 μm or more and 20 μm or less, a fiber length of 10 μm or more and 150 μm or less, and an aspect ratio of 2 or more and 20 or less.

12. The sliding member according to claim 10,
wherein the fluororesin is polytetrafluoroethylene.

13. A bearing comprising:
a metallic substrate;
a porous layer formed on a surface of the metallic substrate; and
a sliding layer that covers the porous layer, the sliding layer being a cylindrical internal circumference and annular innermost layer,
wherein the porous layer is made of a metal itself or an alloy composition,
wherein the sliding layer is made of a lead-free resin composition,
wherein the resin composition consists of a pitch-based carbon fiber and a fluororesin, and assuming weight of the resin composition as 100, more than 10 weight % and 35 weight % or less of the pitch-based carbon fiber is contained and the remainder of the resin composition is only the fluororesin.

14. A bearing comprising:
a metallic substrate;
a porous layer formed on a surface of the metallic substrate; and
a sliding layer that covers the porous layer, the sliding layer being a cylindrical internal circumference and annular innermost layer,
wherein the porous layer is made of a metal itself or an alloy composition,
wherein the sliding layer is made of a lead-free resin composition,
wherein the lead-free resin composition consists of a pitch-based carbon fiber, a fluororesin, and any of or a combination of two or more of an aramid fiber, an iron oxide, molybdenum disulfide, a graphite, and zinc, zinc alloy or zinc compound, wherein assuming weight of the resin composition as 100, a content of the pitch-based carbon fiber is more than 10 weight % and 35 weight % or less, a content of the aramid fiber is more than 0 weight % and 14 weight % or less when the aramid fiber is added;

a content of the iron oxide is more than 0 weight % and 37 weight % or less when the iron oxide is added;

a content of the molybdenum disulfide is more than 0 weight % and 20 weight % or less when the molybdenum disulfide is added;

a content of the graphite is more than 0 weight % and 10 weight % or less when the graphite is added;

a content of the zinc, zinc alloy or zinc compound is more than 0 weight % and 40 weight % or less when the zinc, zinc alloy or zinc compound is added, and the remainder is the fluororesin.

15. A sliding member comprising:

a lead-free resin composition, wherein assuming weight of the resin composition as 100, the resin composition contains more than 10 weight % and 35 weight % or less of a pitch-based carbon fiber, wherein the resin composition further contains a combination of two or more of an aramid fiber, an iron oxide, molybdenum disulfide, a graphite, and zinc, zinc alloy or zinc compound, more than 0 weight % and 14 weight % or less of the aramid fiber is contained when the aramid fiber is added;

more than 0 weight % and 37 weight % or less of the iron oxide is contained when the iron oxide is added;

more than 0 weight % and 20 weight % or less of the molybdenum disulfide is contained when the molybdenum disulfide is added;

more than 0 weight % and 10 weight % or less of the graphite is contained when the graphite is added;

more than 0 weight % and 40 weight % or less of the zinc, zinc alloy or zinc compound is contained when the zinc, zinc alloy or zinc compound is added, and the remainder is a fluororesin.

16. The sliding member according to claim 15, further comprising:

a metallic substrate;

a porous layer formed on a surface of the metallic substrate; and a sliding layer that covers the porous layer, wherein the porous layer is made of a metal itself or an alloy composition, wherein the sliding layer is made of the lead-free resin composition.

17. A bearing comprising:

a metallic substrate;

a porous layer formed on a surface of the metallic substrate; and a sliding layer that covers the porous layer, the sliding layer being a cylindrical internal circumference and annular innermost layer, wherein the porous layer is made of a metal itself or an alloy composition, wherein the sliding layer is made of a lead-free resin composition, wherein assuming weight of the resin composition as 100, the resin composition contains more than 10 weight % and 35 weight % or less of a pitch-based carbon fiber, wherein the resin composition further contains a combination of two or more of an aramid fiber, an iron oxide, molybdenum disulfide, a graphite, and zinc, zinc alloy or zinc compound, more than 0 weight % and 14 weight % or less of the aramid fiber is contained when the aramid fiber is added;

more than 0 weight % and 37 weight % or less of the iron oxide is contained when the iron oxide is added;

more than 0 weight % and 20 weight % or less of the molybdenum disulfide is contained when the molybdenum disulfide is added;

more than 0 weight % and 10 weight % or less of the graphite is contained when the graphite is added;

more than 0 weight % and 40 weight % or less of the zinc, zinc alloy or zinc compound is contained when the zinc, zinc alloy or zinc compound is added, and the remainder is a fluororesin.

\* \* \* \* \*